(No Model.)

C. LA DOW.
DISK HARROW.

No. 323,344. Patented July 28, 1885.

WITNESSES
Ed. A. Newman.
Al. C. Newman.

INVENTOR
Charles La Dow,
By his Attorneys
Baldwin, Hopkins & Peyton.

UNITED STATES PATENT OFFICE.

CHARLES LA DOW, OF ALBANY, NEW YORK.

IMPROVEMENT IN DISK-HARROWS.

SPECIFICATION forming part of Letters Patent No. 323,344, dated July 28, 1885.

Application filed July 6, 1885. (No model.)

*To all whom it may concern:*

Be it known that I, CHARLES LA DOW, of Albany, in the State of New York, have invented certain new and useful Improvements in Disk-Harrows, of which the following is a specification.

The objects of my invention are, first, to arrange the disk-gangs on opposite sides of the central draft-line so that the end-thrust of one gang is neutralized or counteracted by the end-thrust of the other, and this I accomplish by causing the inner disks of the gangs when in the working position to abut against each other; second, to cause the rotation of one gang to impart or help to impart a rotary motion to the other gang. This is accomplished more or less by the abutting disks, whether such disks be plain or corrugated; but, in order to more effectually accomplish the result, I employ radially-corrugated disks.

Figure 1:
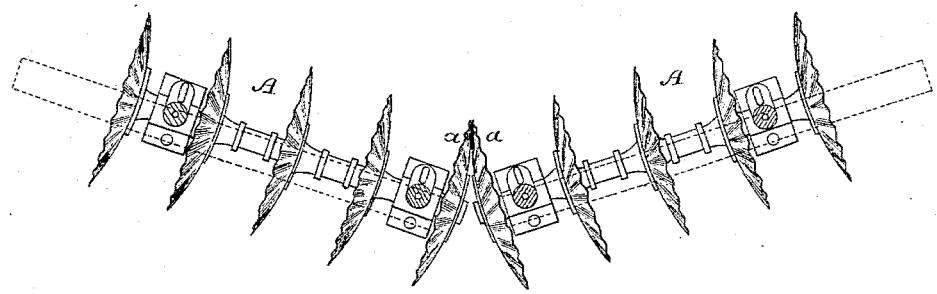
Figure 2:
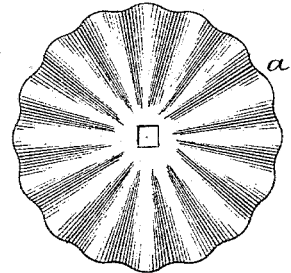

In the accompanying drawings, Figure 1 is a detached plan view of two opposing gangs, and Fig. 2 a view of a corrugated disk.

A A are opposing gangs of concavo-convex cutting-disks, which are mounted in any suitable frame and operated and adjusted to vary their angle to the line of draft in any suitable way. When the gangs are drawn into the working position illustrated in Fig. 1, the inner disks, *a a*, abut against each other, as clearly shown in the drawings. When, therefore, the harrow is at work, the end-thrusts of the gangs, caused by the pressure of the earth, will be neutralized.

It is obvious that when the disk-gangs are set at the working angle so that the inner disks abut firmly against each other, the two gangs will more readily revolve together, as the revolution of either gang will tend, through the contact of the inner disks, to drive the other gang.

In the drawings I have illustrated disks having radial corrugations, as clearly shown in Fig. 2. In such an arrangement the corrugations in the two abutting disks mesh with each other and insure uniform rotation of the two gangs.

This application constitutes a division of my application filed January 15, 1885, No. 153,017, and any subject-matter herein shown common to both cases and not herein claimed is disclaimed.

I claim as my invention—

1. The combination of two opposing disk-gangs arranged upon opposite sides of the draft line and adapted to have their inner disks abut against each other when the gangs are in their working position, substantially as and for the purpose set forth.

2. The combination of two opposing disk-gangs, the inner disks of the gangs being corrugated, as set forth, and arranged to abut against each other when the gangs are thrown into the working position.

In testimony whereof I have hereunto subscribed my name.

CHARLES LA DOW.

Witnesses:
 JOHN VAN VLACK, Jr.,
 S. G. SPEIR,